US012756010B2

(12) United States Patent
Nam et al.

(10) Patent No.: US 12,756,010 B2
(45) Date of Patent: Oct. 6, 2026

(54) METHOD FOR MANUFACTURING POLYMER SOLID ELECTROLYTE

(71) Applicant: LG Energy Solution, Ltd., Seoul (KR)

(72) Inventors: Sunghyun Nam, Daejeon (KR); Hyeaeun Han, Daejeon (KR); Dong Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 78 days.

(21) Appl. No.: 18/842,729

(22) PCT Filed: May 31, 2023

(86) PCT No.: PCT/KR2023/007476

§ 371 (c)(1),
(2) Date: Aug. 29, 2024

(87) PCT Pub. No.: WO2023/234715

PCT Pub. Date: Dec. 7, 2023

(65) Prior Publication Data

US 2025/0183369 A1 Jun. 5, 2025

(30) Foreign Application Priority Data

May 31, 2022 (KR) ........................ 10-2022-0066932
May 31, 2023 (KR) ........................ 10-2023-0070122

(51) Int. Cl.
*H01M 10/05* (2010.01)
*H01M 10/0565* (2010.01)

(52) U.S. Cl.
CPC .................. *H01M 10/0565* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS 6,469,107 B1 10/2002 Sato
2017/0069933 A1 3/2017 Morioka
(Continued)

FOREIGN PATENT DOCUMENTS

CN 108962604 A 12/2018
CN 110540727 A 12/2019
(Continued)

OTHER PUBLICATIONS

Juanjuan Yin et al. (2022), "MXene-based film electrode and all-round hydrogel electrolyte for flexible all-solid supercapacitor with extremely low working temperature," Cell Report Physical Science 3, 100893, May 18, 2022, 19 pages.
(Continued)

*Primary Examiner* — Austin Murata
(74) *Attorney, Agent, or Firm* — BRYAN CAVE LEIGHTON PAISNER LLP

(57) ABSTRACT

A method for preparing a polymer solid electrolyte, and the polymer solid electrolyte prepared by freezing and thawing includes a cross-linked structure formed by a cross-linkable functional group, and the cross-linked structure includes (a) a cross-linkage between the cross-linkable functional groups, (b) a cross-linkage between the cross-linkable functional group and a solvent, and (c) a bond between the cross-linkable functional group and a lithium salt. Accordingly, even without using a separate plasticizer, crystallinity of the polymer solid electrolyte is reduced, and ionic conductivity can be improved. In addition, continuous processing and mass production are possible.

16 Claims, 2 Drawing Sheets

(56) References Cited

U.S. PATENT DOCUMENTS

| | | | | |
|---|---|---|---|---|
| 2017/0179524 | A1 | 6/2017 | Zdilla | |
| 2019/0036157 | A1 | 1/2019 | Su | |
| 2019/0190065 | A1* | 6/2019 | Abouali .............. | H01M 10/058 |

FOREIGN PATENT DOCUMENTS

| | | | |
|---|---|---|---|
| CN | 111668539 | A | 9/2020 |
| CN | 110571480 | B | 1/2021 |
| CN | 112259788 | A | 1/2021 |
| CN | 110581315 | B | 4/2021 |
| CN | 112764285 | A | 5/2021 |
| JP | 2001-084832 | A | 3/2001 |
| JP | 4990447 | B2 | 8/2012 |
| JP | 5994966 | B2 | 9/2016 |
| JP | 2019-029330 | A | 2/2019 |
| KR | 10-2001-0024940 | A | 3/2001 |
| KR | 10-2016-0138207 | A | 12/2016 |
| KR | 10-2277064 | B1 | 7/2021 |
| WO | 2015133388 | A1 | 9/2015 |
| WO | 2022/074369 | A1 | 4/2022 |

OTHER PUBLICATIONS

Li Chen et al. (2021), "A PVA/LiCI/PEO interpenetrating composite electrolyte with a three-dimensional dual-network for all-solid-state flexible alumninum-air batteries," RSC Advances, Royal Society of Chemistry, vol. 11, pp. 39476-39483.

* cited by examiner

【FIG. 1】
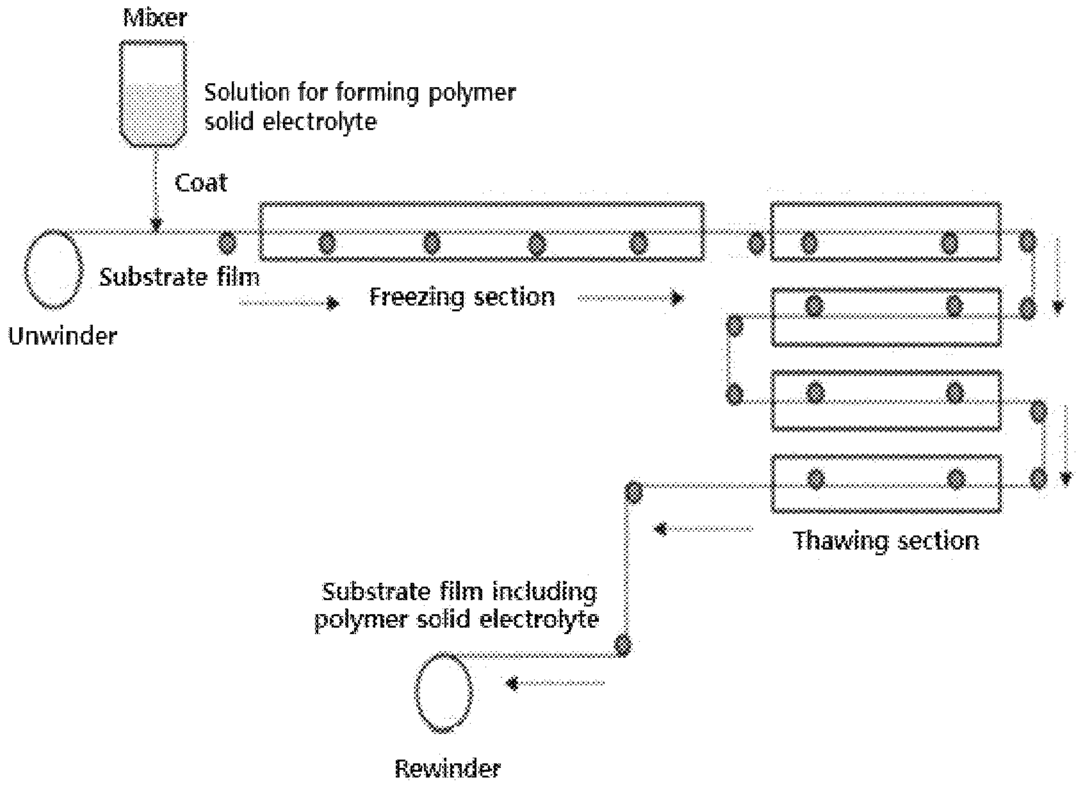

【FIG. 2】
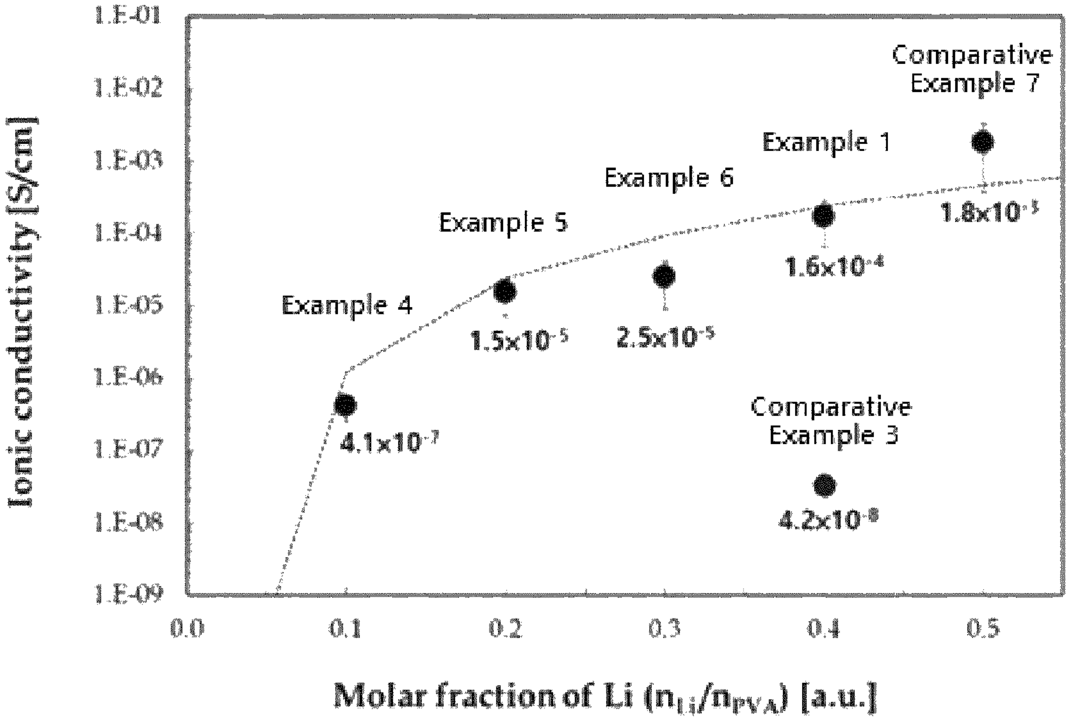
【FIG. 3】
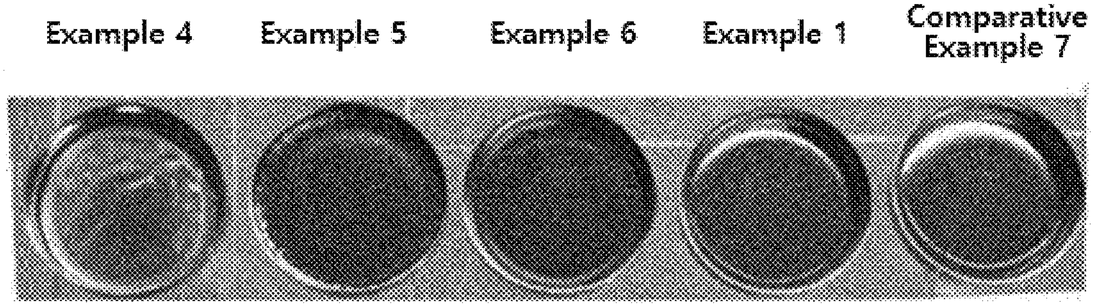

METHOD FOR MANUFACTURING POLYMER SOLID ELECTROLYTE

CROSS-REFERENCE TO RELATED APPLICATIONS

The present application is a National Phase entry pursuant to 35 U.S.C. § 371 International Application No. of PCT/KR2023/007476 filed on May 31, 2023, and claims priority to and the benefit of Korean Patent Application No. 10-2022-0066932 filed on May 31, 2022, and Korean Patent Application No. 10-2023-0070122 filed on May 31, 2023, the entire contents of which are incorporated by reference as part of this specification.

TECHNICAL FIELD

The present invention relates to a method for preparing a polymer solid electrolyte.

BACKGROUND ART

Since a lithium-ion battery using a liquid electrolyte has a structure in which the negative electrode and the positive electrode are partitioned by a separator, if the separator is damaged by deformation or external impact, a short circuit may occur, which may lead to dangers such as overheating or explosion. Therefore, it can be said that the development of a solid electrolyte that can secure safety in the field of the lithium-ion secondary batteries is a very important task.

A lithium secondary battery using a solid electrolyte has advantages in that the safety of the battery is increased, and the leakage of the electrolyte solution can be prevented, thereby improving the reliability of the battery and making it easy to manufacture a thin battery. In addition, since lithium metal can be used as a negative electrode, energy density can be improved, and accordingly, it is expected to be applied to high-capacity secondary batteries for electric vehicles, in addition to small secondary batteries, and is in the limelight as a next-generation battery.

A polymer material made of an ion-conductive material or an inorganic material of an oxide or a sulfide having ion-conductive properties may be used for a polymer solid electrolyte, among solid electrolytes, and a material having a hybrid form in which a polymer material and an inorganic material are mixed has also been proposed.

Such a conventional polymer solid electrolyte was prepared through a solution casting and a high-temperature drying process. However, the conventional preparation technology for the polymer solid electrolyte has limitations in that it is difficult to prepare the polymer solid electrolyte with improved ionic conductivity due to the high crystallinity of the crystalline polymer or semi-crystalline polymer. In other words, since high crystallinity of a polymer hinders polymer chain mobility, lithium ion migration inside the polymer solid electrolyte is also limited, and thus it has been difficult to improve ionic conductivity of the polymer solid electrolyte.

For example, conventional polymer solid electrolytes can be prepared by forming a coating film using polyvinyl alcohol (PVA) containing a hydroxyl group, which is a cross-linkable functional group, as a polymer, and then performing a high-temperature drying process. Specifically, after preparing a PVA aqueous solution by dissolving the PVA in water, the PVA aqueous solution is applied on a substrate by solution casting to form a coating film, and dried at room temperature or high temperature to form a polymer solid electrolyte in the form of a PVA film. At this time, the high temperature may mean 80° C. or higher, which is the glass transition temperature (Tg) of PVA. In the drying process, after the moisture evaporates, a hydrogen bond between the cross-linkable functional groups contained in the PVA is formed, and polymer chain folding occurs due to the hydrogen bond, and thus the degree of crystallization of the polymer film increases. As the degree of crystallization increases, a polymer film with brittleness results. In polymer films with a high degree of crystallization and brittleness, as the polymer chain mobility decreases, when there are dissociated ions inside the polymer film a phenomenon in which the ionic mobility is also remarkably reduced occurs. For this reason, the general PVA film prepared by the high-temperature drying process after forming the coating film as described above exhibits physical properties that are not suitable as polymer solid electrolytes for lithium secondary batteries.

In order to overcome these limitations of conventional polymer solid electrolytes, a technique has been developed to improve the mobility of the polymer chain and improve the ionic conductivity of the polymer solid electrolyte by adding a plasticizer to a crystalline polymer or semi-crystalline polymer. However, when a plasticizer is used, it may be difficult to set process conditions because appropriate dispersibility and solubility (miscibility) between the polymer and the plasticizer must be secured. In addition, when a liquid plasticizer is applied, compatibility with the polymer is reduced, and thus it may be difficult to perform the preparation process of the polymer solid electrolyte.

Therefore, there is a demand for technology on a method for preparing a polymer solid electrolyte in a free-standing film form capable of a continuous process without using a separate additive such as a plasticizer.

(Patent Document 1) Chinese Laid-open Patent Publication No. 112259788

SUMMARY OF THE INVENTION

It is an object of the present invention to provide a method for preparing a polymer solid electrolyte capable of improving ionic conductivity and is a continuous process.

It is another object of the present invention to provide an all-solid-state battery including a polymer solid electrolyte prepared by the above-mentioned preparation method.

In order to achieve the above objects, the present invention provides a method for preparing a polymer solid electrolyte, including:

(1) preparing a solution for forming a polymer solid electrolyte including a polymer solution containing a cross-linkable functional group, and a lithium salt;

(2) unwinding a substrate film using an unwinder and supplying the substrate film to a transfer path;

(3) forming a coating film by applying the solution for forming a polymer solid electrolyte on the substrate film;

(4) freezing the coating film by transferring the coating film-formed substrate film to a freezing section;

(5) preparing a polymer solid electrolyte layer by transferring the frozen coating film-formed substrate film to a thawing section to thaw the frozen coating film; and (6) winding the substrate film including the polymer solid electrolyte layer using a rewinder for recovery.

In addition, the present invention provides an all-solid-state battery including a polymer solid electrolyte prepared by the preparation method of the present invention.

A method for preparing a polymer solid electrolyte according to the present invention is, due to a structure including a cross-linked structure formed by a cross-linkable functional group contained in a polymer and an amorphous polymer chain, capable of reducing crystallinity of the polymer, thereby improving ionic conductivity. In addition, brittleness, ductility and viscosity may be reduced due to the structural properties.

In addition, the method for preparing a polymer solid electrolyte according to the present invention is capable of preparing a polymer solid electrolyte using a continuous process, and is capable of mass production.

BRIEF DESCRIPTION OF THE DRAWINGS

FIG. 1 is a flow chart of a method for preparing a polymer solid electrolyte of the present invention.

FIG. 2 is a graph illustrating a tendency of ionic conductivity of an electrolyte depending on a molar ratio ([Li]/[OH]) between a cross-linkable functional group and a lithium salt.

FIG. 3 is a photograph illustrating an electrolyte form depending on a molar ratio ([Li]/[OH]) between a cross-linkable functional group and lithium.

DETAILED DESCRIPTION

Hereinafter, the present invention will be described in more detail to help the understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

As used herein, the term "cross-linked structure" refers to a structure comprising a three-dimensional frame formed by polymer chains and an internal space of the frame. The polymer chain may be formed by cross-linkages comprising cross-linkable functional groups contained in the polymer. Since the cross-linked structure has a three-dimensional shape and has a form in which polymer chains are entangled with each other, it can also be referred to as a three-dimensional network structure.

Method for Preparing Polymer Solid Electrolyte

FIG. 1 is a flow chart of a preparation method for a polymer solid electrolyte according to certain embodiments of the present invention.

The present invention relates to a method for preparing a polymer solid electrolyte, and the method for preparing a polymer solid electrolyte of the present invention includes the steps of:

(1) preparing a solution for forming a polymer solid electrolyte including a polymer solution containing a cross-linkable functional group and a lithium salt;

(2) unwinding a substrate film using an unwinder and supplying the substrate film to a transfer path;

(3) forming a coating film by applying the solution for forming the polymer solid electrolyte on the substrate film;

(4) freezing the coating film by transferring the coating film-formed substrate film to a freezing section;

(5) preparing a polymer solid electrolyte layer by transferring the frozen coating film-formed substrate film to a thawing section to thaw the frozen coating film; and (6) winding the substrate film including the polymer solid electrolyte layer using a rewinder for recovery.

In the above, (1) is a step of preparing a solution for forming a polymer solid electrolyte including an aqueous polymer solution containing a cross-linkable functional group, and a lithium salt.

In the present invention, the polymer including a cross-linkable functional group may be a polymer having a cross-linkable functional group capable of forming a cross-linked structure by forming (a) a cross-linkage between the cross-linkable functional groups, (b) a cross-linkage between the cross-linkable functional group and a solvent, and (c) a bond between the cross-linkable functional group and the lithium salt. The bonds of (a), (b) and (c) will be described later in more detail.

For example, the cross-linkable functional group may include one or more selected from the group consisting of a hydroxyl group, a carboxyl group, and an amide group.

In addition, the weight average molecular weight (Mw) of the polymer having the cross-linkable functional group may be 80,000 g/mol to 130,000 g/mol, and specifically, may be 80,000 g/mol or more, 83,000 g/mol or more or 85,000 g/mol or more, and 90,000 g/mol or less, 110,000 g/mol or less or 130,000 g/mol or less. If the weight average molecular weight (Mw) of the polymer having the cross-linkable functional group is less than 80,000 g/mol, the bond by the cross-linkable functional group may not be sufficiently formed to obtain a cross-linked structure. If the weight average molecular weight (Mw) of the polymer having the cross-linkable functional group exceeds 130,000 g/mol, the entanglement of the polymer chain is increased in the aqueous polymer solution, and the penetration rate of the solvent into the polymer chain is decreased. Accordingly, gelation of the polymer is accelerated, and thus the solubility of the polymer is lowered and the bonding by the cross-linkable functional group cannot be performed smoothly, so the formation of a cross-linked structure may not be easy.

In addition, the polymer including a cross-linkable functional group has the polymer and the solvent smoothly phase-separated in the polymer solution, and by the cross-linkable functional group included in the phase-separated polymer in the step of freezing the coating film of step (4), a property of readily forming the bonds of (a), (b) and (c) may be obtained.

For example, the polymer having the cross-linkable functional group may include one or more selected from the group consisting of polyvinyl alcohol (PVA), gelatin, methyl cellulose, agar, dextran, poly(vinyl pyrrolidone), poly(ethylene oxide), poly(acrylamide), poly(acrylic acid) (PAA), starch-carboxymethyl cellulose, hyaluronic acid-methyl cellulose, chitosan, poly(N-isopropylacrylamide), and amino-terminated polyethylene glycol (amino-terminated PEG). Preferably, the polymer having a cross-linkable functional group may be polyvinyl alcohol, the polyvinyl alcohol may be efficiently phase-separated from the solvent in the step of freezing the coating film of step (4), and the bonds of (a), (b) and (c) induced from the cross-linkable functional group of the polyvinyl alcohol phase-separated from the solvent may be advantageous in forming the cross-linked structure.

In the present invention, the lithium salt is included in an inner space of the cross-linked structure in a dissociated state, and ionic conductivity of the polymer solid electrolyte may be improved.

In addition, the lithium salt can form (c) the bond between the cross-linkable functional group and the lithium salt, thereby preventing the generation of crystallinity of the polymer solid electrolyte and promoting the formation of an amorphous polymer chain at the same time.

The lithium salt may include one or more selected from the group consisting of $LiNO_3$, LiOH, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, and $(FSO_2)_2NLi$.

In the present invention, the molar ratio ([Li]/[G]) of the cross-linkable functional group ([G]) of the polymer having the cross-linkable functional group and lithium ([Li]) of the lithium salt contained in the polymer solid electrolyte may be exceeding 0.1 and less than 0.5, and specifically may be exceeding 0.1, 0.2 or more, or 0.3 or more, and may be 0.4 or less, or less than 0.5. If the molar ratio ([Li]/[G]) is 0.1 or less, as the content of the lithium salt is reduced, the ionic conductivity of the polymer solid electrolyte may be lowered. If the molar ratio ([Li]/[G]) is 0.5 or more, the content of the polymer having the cross-linkable functional group is reduced, so that the bonds of (a), (b) and (c) may not be sufficiently formed, and accordingly crystallinity may be increased and ionic conductivity may be decreased. If the cross-linkable functional group is a hydroxyl group (OH—), [G] may be expressed as [OH] or [O].

The solvent used when preparing the polymer solution may be a polar solvent, and for example, may be water. In other words, the polymer solution may be an aqueous polymer solution.

The concentration of the polymer solution containing the cross-linkable functional group may be properly adjusted considering the extent of smoothly proceeding the coating process when applying the solution for forming the polymer solid electrolyte on a substrate film. For example, the polymer having a cross-linkable functional group may be included in an amount of 5% by weight to 20% by weight, specifically, 5% by weight or more, 7% by weight or more or 9% by weight or more, and 13% by weight or less, 17% by weight or less or 20% by weight or less, based on the total weight of the polymer solution containing a cross-linkable functional group. If the polymer having the cross-linkable functional group is included in an amount of less than 5% by weight, the concentration of the polymer is too dilute and thus it may flow down when applied on the substrate film. If the polymer having the cross-linkable functional group is included in an amount exceeding 20%, it is difficult to dissolve the lithium salt at a desired concentration in the solution of the polymer, and it may be difficult to apply it in the form of a uniform thin film.

(2) is a step of unwinding a substrate film using an unwinder and supplying the substrate film to a transfer path.

The unwinder unwinds the substrate film wound in a roll shape and supplies the film to a predetermined transfer path, may unwind and supply the substrate film with its own drive, and may unwind and supply the substrate film by driving force of a rewinder winding the substrate film including the polymer solid electrolyte layer.

Accordingly, the method for preparing a polymer solid electrolyte of the present invention may be a roll-to-roll process.

The substrate film is not particularly limited as long as it is capable of acting as a support on which the solution for forming the polymer solid electrolyte is applied. For example, the substrate film may be stainless steel (SS), a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film.

(3) is a step of forming a coating film by applying the solution for forming the polymer solid electrolyte on the substrate film.

The coating method in the present invention is not particularly limited as long as it is a method capable of applying the solution for forming the polymer solid electrolyte on the substrate film in a film form. For example, the coating method may be bar coating, roll coating, spin coating, slit coating, die coating, blade coating, comma coating, slot die coating, lip coating, spray coating or solution casting.

As one embodiment of the present invention, a solution casting method may be used. More specifically, the solution for forming the polymer solid electrolyte prepared in step (1) is put into a mixer, and then, the mixer is placed on the substrate film, so that the solution for forming a polymer solid electrolyte may be continuously casted on the substrate film supplied to a transfer path to form a coating film.

(4) is a step of freezing the coating film by transferring the coating film-formed substrate film to a freezing section, and in step (4), a polymer solid electrolyte may be prepared. The polymer solid electrolyte of the present invention includes a cross-linked structure; and an amorphous polymer chain containing the cross-linkable functional group, and the cross-linked structure; and the amorphous polymer chain containing the cross-linkable functional group may be formed by freezing the coating film. The polymer solid electrolyte of the present invention includes the amorphous polymer chain and a lithium salt in an inner space formed in the cross-linked structure, and the lithium salt is included in a dissociated state.

The cross-linked structure may be formed by some of the cross-linkable functional groups included in the polymer forming localized crystallites, and the localized crystallites acting as a cross-linkable junction point and forming a cross-linkage. At this time, the crystallite means a shape like a knot made by tangled threads, unlike a crystal structure formed by polymer chain folding.

In addition, the cross-linked structure includes (a) a cross-linkage between the cross-linkable functional groups, (b) a cross-linkage between the cross-linkable functional group and a solvent, and (c) a bond between the cross-linkable functional group and the lithium salt. The bonds of (a), (b) and (c) may be induced by the cross-linkable functional group to form the cross-linked structure.

In the present invention, (a) the cross-linkage between the cross-linkable functional groups may include a hydrogen bond between the cross-linkable functional groups, and for example, the hydrogen bond may be a hydrogen bond between OH-s.

When the cross-linked structure is formed only with (a) the cross-linkage between the cross-linkable functional groups, crystallinity occurs in the polymer solid electrolyte, and thus ionic conductivity may decrease.

However, the cross-linked structure includes not only (a) the cross-linkage between the cross-linkable functional groups, but also (b) the cross-linkage between the cross-linkable functional group and a solvent and (c) the bond between the cross-linkable functional group and the lithium salt, and therefore, crystallinity of the polymer solid electrolyte may be prevented from occurring.

In the present invention, (b) the cross-linkage between the cross-linkable functional group and a solvent may include a hydrogen bond, and for example, the hydrogen bond may be a hydrogen bond between $OH^-$ and $H^+$. At this time, $H^+$ may be derived from a water solvent.

(b) the cross-linkage between the cross-linkable functional group and a solvent may mean a hydrogen bond between some of the solvent remaining in the freezing process and the thawing process of the step (5) as describe later and the cross-linkable functional group.

In addition, (b) the cross-linkage between the cross-linkable functional group and a solvent hinders (a) the cross-linkage between the cross-linkable functional groups, so that the cross-linked structure is not formed only with (a) the cross-linkage between the cross-linkable functional groups, and therefore, an increase in the crystallinity of the polymer solid electrolyte may be prevented. The solvent may include water.

In the present invention, (c) the bond between the cross-linkable functional group and the lithium salt may include a bond by a Lewis acid-base interaction, and for example, the bond may be a bond between $OH^-$ and $Li^+$.

(c) the bond between the cross-linkable functional group and the lithium salt interferes with (a) the cross-linkage between cross-linkable functional groups and (b) the cross-linkage between the cross-linkable functional group and the solvent, so that the cross-linked structure does not consist only of the cross-linkage between (a) the cross-linkable functional groups, and thus the generation of crystallinity of the polymer solid electrolyte can be prevented. At the same time, the formation of amorphous polymer chains can be promoted. As the amorphous polymer chain is formed, the mobility of the polymer chain is improved, and thus the hopping effect of the lithium ion is increased, so that the ionic conductivity of the polymer solid electrolyte can be improved.

In the present invention, the amorphous polymer may be formed in a freezing process as described later, and may refer to a polymer chain that does not form crystals by regular folding of the polymer chain and exists in a free behavior state. That is, the amorphous polymer chain may include a polymer having a cross-linkable functional group that does not form the bonds such as (a), (b) and (c).

Due to the cross-linked structure, the polymer solid electrolyte is not easily broken or destroyed and thus can play a role as a support for an electrolyte containing lithium ions stably.

In addition, due to the amorphous polymer chain, since the polymer solid electrolyte exhibits elasticity, it can minimize brittleness, which is a property of being easily broken, and since the mobility of the polymer chain is excellent and the mobility of lithium ions inside the electrolyte is improved, the polymer solid electrolyte with improved ionic conductivity can be provided.

In addition, in (4), the polymer and water included in the aqueous polymer solution containing the cross-linkable functional group used for forming the coating film may be phase separated. The phase separation may be induced since a hydrogen bond between the water molecules is stronger than a hydrogen bond between the cross-linkable functional group and the water molecule. The water molecules aggregated by the hydrogen bonds between the water molecules are present in an ice phase by the freezing of step (4). As a result, the number of the cross-linkable functional groups forming hydrogen bonds through an interaction with the water molecules significantly decreases.

In other words, in the step of freezing the coating film, the polymer and water included in the aqueous polymer solution need to be phase separated first, and the phase separation may be induced by hydrogen bonds between the water molecules. After all, a main target of the freezing step may be water molecules that induce phase separation. Alternatively, after the phase separation is induced to some extent, the target of the freezing step may be water molecules and the polymer.

Due to the phase separation, the inside of the coating film is divided into (i) a polymer-poor phase and (ii) a polymer-rich phase.

The (i) polymer-poor phase is a portion containing water molecules aggregated by hydrogen bonds between water molecules and exists as an ice phase, which can also be referred to as a free water state.

The (ii) polymer-rich phase is a portion containing a polymer phase separated from water. The phase-separated polymer is a polymer having a cross-linkable functional group that is free from interaction with water molecules, and is in a free state after phase separation, does not form crystals by regular folding, and exists in an amorphous state with relatively free behavior, which is called an amorphous polymer chain.

In addition, some of the cross-linkable functional groups included in the phase-separated polymer form a cross-linked structure including the (a), (b) and (c) bonds by localized crystallites acting as a cross-linkable junction point.

The freezing of the coating film of the step (4) may be performed by appropriately selecting a condition sufficient to freeze the coating film. For example, the freezing temperature may be performed at a temperature of −30° C. to −10° C., and specifically, the freezing temperature may be −30° C. or higher, −25° C. or higher or −23° C. or higher, and may be −18° C. or lower, −15° C. or lower or −10° C. or lower. If the freezing temperature is less than −30° C., cracks may occur in the coating film. If the freezing temperature exceeds −10° C., formation of regions of amorphous polymer chains can be difficult because sufficient phase separation between the polymer and water is not achieved. In addition, the freezing may be performed in consideration of a sufficient freezing time within the range of 20 hours to 30 hours.

The freezing section is located in a section where the coating film is formed on the substrate film, and the coating film-formed substrate film is transferred to a rewinder, and may be formed with a plurality of stages.

A polymer solid electrolyte has been prepared through a high-temperature drying process in the art. However, in a high-temperature drying process, polymer chain mobility is inhibited due to high crystallinity of a crystalline polymer or a semi-crystalline polymer, causing restrictions on the lithium-ion migration inside the polymer solid electrolyte, and low ionic conductivity has resulted.

Accordingly, in the present invention, a freezing process is performed instead of a high-temperature drying process and a plasticizer is not used, which may induce (a) a cross-linkage between the cross-linkable functional (b) a cross-linkage between the cross-linkable functional group and a solvent, and (c) a bond between the cross-linkable functional group and a lithium salt by the cross-linkable functional group included in the polymer, thereby preventing polymer crystallization. As a result, preparing a polymer solid electrolyte with improved ionic conductivity can be achieved.

(5) is a step of preparing a polymer solid electrolyte layer by transferring the frozen coating film-formed substrate film to a thawing section to thaw the frozen coating film.

In the step (5), ice included in the (i) polymer-poor phase melts and evaporates, and accordingly, a polymer solid electrolyte with an increased free volume may be prepared.

The thawing may be performed by properly selecting a condition under which the frozen coating film is thawed enough to be used as a polymer solid electrolyte. For example, the thawing temperature may be 15° C. to 35° C., or room temperature (25° C.). If the thawing temperature is less than 15° C., moisture drying efficiency may be reduced after the thawing (ice melting). If the temperature exceeds 35° C., the coating film may shrink, resulting in wrinkles or warping.

As described above, through step (4) of freezing the coating film and step (5) of thawing the frozen coating film, the bonds of (a), (b) and (c) are induced to form the cross-linked structure, and the amorphous polymer chain may be formed.

Accordingly, steps (4) and (5) may be repeatedly performed, and the degree of forming of the cross-linked structure may be adjusted depending on the number of repetitions. When steps (4) and (5) are referred to as 1 cycle, step (4) of freezing the coating film and step (5) of thawing the frozen coating film may be performed in 1 cycle or more, 2 cycles or more, 3 cycles or more or 5 cycles or more. The upper limit of the cycle is not particularly limited, but may be 10 cycles or less, 13 cycles or less or 15 cycles or less. As the cycle increases in the above-mentioned range, the cross-linked structure is formed more, and accordingly, modulus and strength of the polymer solid electrolyte may increase.

When the thawing is completed in the step (5), the coating film may be used as a polymer solid electrolyte.

The thawing section is located in a section where the frozen coating film-formed substrate film is transferred to a rewinder, and may be formed with a plurality of stages.

After the step (5) and before step (6), a step of loading the polymer solid electrolyte layer into a liquid electrolyte and drying may be further included.

By further including this step, ionic conductivity of the polymer solid electrolyte may be further improved due to the liquid electrolyte. The liquid electrolyte may also be included in an inside space of the cross-linked structure.

The liquid electrolyte may be a liquid electrolyte commonly used in the art, and the composition of the liquid electrolyte is not particularly limited as long as it is usable in a lithium secondary battery. For example, the liquid electrolyte may include a lithium salt and a non-aqueous solvent. The lithium salt may be one of the lithium salts described above. In addition, the non-aqueous solvent may include one or more selected from the group consisting of propylene carbonate (PC), ethylene carbonate (EC), vinylene carbonate (VC), diethyl carbonate (DEC), dimethyl carbonate (DMC), methylethyl carbonate (MEC), ethylmethyl carbonate (EMC), tetrahydrofuran (THE), 2-methyltetrahydrofuran (2MeTHE), dioxolane (DOX), dimethoxyethane (DME), diethoxyethane (DEE), γ-butyrolactone (GBL), acetonitrile (AN), and sulfolane.

In addition, the liquid electrolyte may be included in an amount of 1% by weight to 5% by weight, based on the total weight of the polymer solid electrolyte. When the liquid electrolyte content is 1% by weight or less, the effect of improving ionic conductivity may be insignificant, and when the content exceeds 5% by weight, stability may be reduced.

(6) is a step of winding the substrate film including the polymer solid electrolyte layer using a rewinder for recovery.

The rewinder may recover the substrate film including the polymer solid electrolyte by winding it in a roll shape, and may wind the substrate film including the polymer solid electrolyte layer by its own drive.

The recovered substrate film including the polymer solid electrolyte layer may be used as it is, or, by further performing a step of separating the polymer solid electrolyte layer from the substrate film, the polymer solid electrolyte layer may be used in a free-standing film form.

The free-standing film means a film capable of maintaining a film form by itself without a separate support, that is, without a substrate film, at room temperature and pressure.

The polymer solid electrolyte of the present invention may minimize brittleness by exhibiting elasticity, and has properties as a support stably containing lithium ions, and therefore, may have a form suitable as a polymer solid electrolyte.

The method for preparing a polymer solid electrolyte of the present invention is a roll-to-roll process, and is capable of continuous preparing, thereby enabling mass production.

In the present invention, the polymer solid electrolyte may have ionic conductivity of $10^{-4}$ S/cm or more.

Due to structural properties of including the cross-linked structure as described above, the polymer solid electrolyte has reduced crystallinity, and thereby has improved ionic conductivity. Accordingly, even though it is a solid electrolyte, equal or higher ionic conductivity is obtained compared to an existing liquid electrolyte, and performance of an all-solid-state battery may be improved.

All-Solid-State Battery

The present invention also relates to an all-solid-state battery including the polymer solid electrolyte, wherein the all-solid-state battery includes a negative electrode, a positive electrode, and a polymer solid electrolyte interposed between the negative electrode and the positive electrode, and the solid electrolyte has the above-described characteristics.

Specifically, the polymer solid electrolyte may be suitable as an electrolyte for an all-solid-state battery because physical cross-linkage is formed through the freezing and thawing processes, and thus crystallinity is lowered and ionic conductivity is improved accordingly.

In the present invention, the positive electrode contained in the all-solid-state battery includes a positive electrode active material layer, and the positive electrode active material layer may be formed on one surface of the positive electrode current collector.

The positive electrode active material layer includes a positive electrode active material, a binder, and a conductive material.

In addition, the positive electrode active material is not particularly limited as long as it is a material capable of reversibly intercalating and de-intercalating lithium ions, and for example, may be, but is not limited to, layered compounds or compounds substituted with one or more transition metals, such as lithium cobalt oxide ($LiCoO_2$), lithium nickel oxide ($LiNiO_2$), $Li[Ni_xCO_yMn_zM_v]O_2$ (wherein, M is any one or two or more elements selected from the group consisting of Al, Ga and In; 0.3≤x<1.0, 0≤y, z≤0.5, 0≤v≤0.1, x+y+z+v=1), $Li(Li_aM_{b-a-b'}M'_{b'})O_{2-c}A_c$ (wherein, 0≤a≤0.2, 0.65b≤1, 0≤b'≤0.2, 0≤c≤0.2; M comprises Mn and one or more selected from the group consisting of Ni, Co, Fe, Cr, V, Cu, Zn and Ti; M' is one or more selected from the group consisting of Al, Mg and B, and A is one or more selected from the group consisting of P, F, S and N); lithium manganese oxide such as Formula $Li_{1+y}Mn_{2-y}O_4$ (wherein, y is 0-0.33), $LiMnO_3$, $LiMn_2O_3$, $LiMnO_2$; lithium copper oxide ($Li_2CuO_2$); vanadium oxide such as $LiV_3O_8$, $V_2O_5$, $Cu_2V_2O_7$; Ni site type lithium nickel oxide represented by Formula $LiNi_{1-y}M_yO_2$ (wherein, M=Co, Mn, Al, Cu, Fe, Mg, B or Ga, y=0.01-0.3); lithium manganese composite oxide represented by Formula $LiMn_{2-y}M_yO_2$ (wherein, M=Co, Ni, Fe, Cr, Zn or Ta, y=0.01-0.1) or $Li_2Mn_3MO_8$ (wherein, M=Fe, Co, Ni, Cu or Zn); $LiMn_2O_4$ in which part of Li in the Formula is substituted with alkaline earth metal ions; disulfide compounds; and $Fe_2(MoO_4)_3$.

In addition, the positive electrode active material may be contained in an amount of 40 to 80% by weight based on the total weight of the positive electrode active material layer. Specifically, the content of the positive electrode active material may be 40% by weight or more or 50% by weight or more, and may be 70% by weight or less or 80% by weight or less. If the content of the positive electrode active material is less than 40% by weight, the connectivity between the wet positive electrode active material layer and the dry positive electrode active material layer may be insufficient. If the content of the positive electrode active material exceeds 80% by weight, mass transfer resistance may be increased.

In addition, the binder is a component that assists bonding between the positive electrode active material and the conductive material, and assists in bonding to the current collector. The binder may comprise one or more selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acrylic rubber, butyl rubber, fluorine rubber, polytetrafluoroethylene, polyethylene, polypropylene, ethylene/propylene copolymer, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resin, phenolic resin, epoxy resin, carboxymethylcellulose, hydroxypropyl cellulose, cellulose acetate, cellulose acetate butyrate, cellulose acetate propionate, cyanoethyl cellulose, cyanoethyl sucrose, polyester, polyamide, polyether, polyimide, polycarboxylate, polycarboxylic acid, polyacrylic acid, polyacrylate, lithium polyacrylate, polymethacrylic acid, polymethacrylate, polyacrylamide, polyurethane, polyvinylidene fluoride, and poly(vinylidene fluoride)-hexafluoropropene. Preferably, the binder may comprise one or more selected from the group consisting of styrene-butadiene rubber, polytetrafluoroethylene, carboxymethyl cellulose, polyacrylic acid, lithium polyacrylate, and polyvinylidene fluoride.

In addition, the binder may be contained in an amount of 1% by weight to 30% by weight, based on the total weight of the positive electrode active material layer, and specifically, the content of the binder may be 1% by weight or more or 3% by weight or more, and may be 15% by weight or less or 30% by weight or less. If the content of the binder is less than 1% by weight, the adhesive force between the positive electrode active material and the positive electrode current collector may be lowered. If the content of the binder exceeds 30% by weight, the adhesive force is improved, but the content of the positive electrode active material is reduced by that amount, and thus the capacity of the battery may be lowered.

In addition, the conductive material is not particularly limited as long as it prevents side reactions in the internal environment of the all-solid-state battery and has excellent electrical conductivity without causing chemical changes in the battery. The conductive material may be typically graphite or conductive carbon, and for example, graphite such as natural graphite, artificial graphite; carbon black such as carbon black, acetylene black, Ketjen black, Denka black, thermal black, channel black, furnace black, lamp black, thermal black; carbon-based materials whose crystal structure is graphene or graphite; conductive fibers such as carbon fibers and metal fibers; carbon fluoride; metal powders such as aluminum powder and nickel powder; conductive whiskers such as zinc oxide and potassium titanate; conductive oxides such as titanium oxide; and conductive polymers such as polyphenylene derivatives may be used alone or in combination of two or more thereof as the conductive material, but is not necessarily limited thereto.

The conductive material may be generally contained in an amount of 0.5% by weight to 30% by weight, based on the total weight of the positive electrode active material layer. Specifically, the content of the conductive material may be 0.5% by weight or more or 1% by weight or more, and may be 20% by weight or less or 30% by weight or less. If the content of the conductive material is too small, i.e., less than 0.5% by weight, it is difficult to expect an effect of improving electrical conductivity or the electrochemical properties of the battery may be deteriorated. If the content of the conductive material exceeds 30% by weight and thus is too large, the amount of the positive electrode active material may be relatively small, so that the capacity and energy density may be lowered. A method for incorporating the conductive material to the positive electrode is not particularly limited, and a conventional method known in the art, such as coating on the positive electrode active material, may be used.

In addition, the positive electrode current collector supports the positive electrode active material layer, and serves to transfer electrons between the external conductive wire and the positive electrode active material layer.

The positive electrode current collector is not particularly limited as long as it has high electrical conductivity without causing chemical changes in the all-solid-state battery. For example, as the positive electrode current collector, copper, stainless steel, aluminum, nickel, titanium, palladium, sintered carbon; a copper or stainless steel surface-treated with carbon, nickel, silver, etc.; an aluminum-cadmium alloy, etc. may be used.

The positive electrode current collector may have a fine irregularity structure on the surface of the positive electrode current collector or have a three-dimensional porous structure, in order to strengthen the bonding force with the positive electrode active material layer. Accordingly, the positive electrode current collector may comprise various forms such as a film, a sheet, a foil, a mesh, a net, a porous body, a foam, and a non-woven fabric.

The positive electrode as described above may be prepared by the conventional method, and specifically, the positive electrode is manufactured by coating and drying a composition for forming the positive electrode active material layer prepared by mixing the positive electrode active material, the conductive material and the binder in an organic solvent, onto the positive electrode collector, and optionally compression-molding it onto the current collector to improve the electrode density. At this time, as the organic solvent, it is preferable to use one that can uniformly disperse the positive electrode active material, the binder, and the conductive material, and that evaporates easily. Specifically, acetonitrile, methanol, ethanol, tetrahydrofuran, water, isopropyl alcohol and the like are exemplified.

In the present invention, the negative electrode comprised in the all-solid-state battery comprises a negative electrode active material layer, and the negative electrode active material layer may be formed on one surface of the negative electrode current collector.

The negative electrode active material may be a material capable of reversibly intercalating or de-intercalating lithium ions (Li+), a material capable of reacting with lithium ions to reversibly form a lithium-containing compound, lithium metal or a lithium alloy.

The material capable of reversibly intercalating or de-intercalating lithium ions (Li+) may be, for example, crystalline carbon, amorphous carbon or mixtures thereof. The material capable of reacting with the lithium ions (Li+) to reversibly form a lithium-containing compound may be, for example, tin oxide, titanium nitrate, or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or lithium metal powder.

The negative electrode active material may be contained in an amount of 40 to 80% by weight based on the total weight of the negative electrode active material layer. Specifically, the content of the negative electrode active material may be 40% by weight or more or 50% by weight or more, and may be 70% by weight or less or 80% by weight or less. If the content of the negative electrode active material is less than 40% by weight, the connectivity between the wet negative electrode active material layer and the dry negative electrode active material layer may be insufficient. If the content of the negative electrode active material exceeds 80% by weight, mass transfer resistance may be increased.

In addition, the binder is the same as described above for the positive electrode active material layer.

In addition, the conductive material is the same as described above for the positive electrode active material layer.

In addition, the negative electrode current collector is not particularly limited as long as it has conductivity without causing chemical change in the battery, and for example, the negative electrode current collector may be copper, stainless steel, aluminum, nickel, titanium, sintered carbon; copper or stainless steel surface-treated with carbon, nickel, titanium, silver, etc.; or aluminum-cadmium alloy. In addition, the negative electrode current collector may be used in various forms, such as a film having fine irregularity on its surface, a sheet, a foil, a net, a porous body, a foam, and a non-woven fabric, as in the positive electrode current collector.

The manufacturing method of the negative electrode is not particularly limited, and may be manufactured by forming a negative electrode active material layer on a negative electrode current collector using a layer or film formation method commonly used in the art. For example, a method such as pressing, coating, or vapor deposition may be used. Also, a case where a thin film of a metal lithium is formed on a metal plate by initial charging after assembling the battery without a lithium thin film on the negative electrode current collector is also included in the negative electrode of the present invention.

In addition, the present invention provides a battery module including the all-solid-state battery as a unit cell, a battery pack including the battery module, and a device comprising the battery pack as a power source.

In this case, specific examples of the above device may include, but are not limited to, a power tool powered by an electric motor; electric cars including an electric vehicle (EV), a hybrid electric vehicle (HEV), a plug-in hybrid electric vehicle (PHEV), and the like; electric motorcycles including an electric bike (E-bike) and an electric scooter (E-scooter); an electric golf cart; and a power storage system.

Hereinafter, preferred examples are presented to aid understanding of the present invention, but the following examples are only illustrative of the present invention, and it will be apparent to those skilled in the art that various changes and modifications can be made within the scope and technical idea of the present invention, and also it is natural that such variations and modifications are within the scope of the appended claims.

EXAMPLES

In the following Examples and Comparative Examples, polymer solid electrolytes were prepared depending on the polymer having a cross-linkable functional group, the molar ratio between the cross-linkable functional group and the lithium ion and the application of freezing/thawing processes, as described in the following Table 1.

TABLE 1

| | Polymer having cross-linkable functional group | | Molar ratio between cross-linkable functional group and lithium ([Li]/[OH]) | Use of freezing/thawing processes |
|---|---|---|---|---|
| | Name | Molecular weight (g/mol) | | |
| Example 1 | PVA | 89,000 | 0.4 | Applied |
| Example 2 | PVA | 85,000 | 0.4 | Applied |
| Example 3 | PVA | 100,000 | 0.4 | Applied |
| Example 4 | PVA | 89,000 | 0.1 | Applied |
| Example 5 | PVA | 89,000 | 0.2 | Applied |
| Example 6 | PVA | 89,000 | 0.3 | Applied |
| Comp. Ex. 1 | PVA | 89,000 | 0.4 | Not applied (High Temp. Drying, 80° C.) |
| Comp. Ex. 2 | PEO (Not including cross-linkable functional group) | 4,000,000 | 0.4 | Applied |
| Comp. Ex. 3 | PVA | 89,000 | 0.4 | Not applied (Room Temp. Drying, 25° C.) |
| Comp. Ex. 4 | PAA | 100,000 | 0.4 | Applied |
| Comp. Ex. 5 | PVA | 50,000 | 0.4 | Applied |
| Comp. Ex. 6 | PVA | 146,000 | 0.4 | Applied |
| Comp. Ex. 7 | PVA | 89,000 | 0.5 | Applied |
| Comp. Ex. 8 | PVA | 89,000 | 0.52 | Applied |

Example 1

PVA (Mw: 89,000 g/mol; degree of hydrolysis: >99%) was mixed with water to prepare a 10 wt % aqueous PVA solution. To the aqueous PVA solution, LiTFSI was added, and the result was stirred to prepare a solution including PVA, which is a polymer having a cross-linkable functional group, and LiTFSI, which is a lithium salt. At this time, "OH" contained in the cross-linkable functional group of the PVA and "Li" included in the lithium salt were set to have a molar ratio ([Li]/[OH]) of 0.4.

After putting the solution into a mixer, the solution was applied on SS foil, which is a substrate film, supplied to a transfer path by an unwinder using a solution casting method, and the result was transferred to a freezing section to be frozen for 24 hours at −20° C. and transferred to a thawing section to be thawed at 25° C., and then a polymer solid electrolyte layer was prepared on the substrate film. The substrate film including the prepared polymer solid electrolyte layer was wound using a rewinder and recovered. After that, the substrate film was peeled off to obtain a polymer solid electrolyte in a free-standing film form.

Example 2

A polymer solid electrolyte was prepared in the same manner as in Example 1, except that PVA having a weight average molecular weight (Mw) of 85,000 g/mol was used.

Example 3

A polymer solid electrolyte was prepared in the same manner as in Example 1, except that PVA having a weight average molecular weight (Mw) of 100,000 g/mol was used.

Example 4

A polymer solid electrolyte was prepared in the same manner as in Example 1, except that "OH", which is the cross-linkable functional group of PVA, and "Li" of the lithium salt were set to have a molar ratio ([Li]/[OH]) of 0.1.

Example 5

A polymer solid electrolyte was prepared in the same manner as in Example 1, except that "OH", which is the cross-linkable functional group of PVA, and "Li" of the lithium salt were set to have a molar ratio ([Li]/[OH]) of 0.2.

Example 6

A polymer solid electrolyte was prepared in the same manner as in Example 1, except that "OH", which is the cross-linkable functional group of PVA, and "Li" of the lithium salt were set to have a molar ratio ([Li]/[OH]) of 0.3.

Comparative Example 1

A polymer solid electrolyte was prepared in the same manner as in Example 1, except that a solution including PVA, which is a polymer having a cross-linkable functional group, and LiTFSI, which is a lithium salt, was applied on SS foil, which is a substrate, and then dried at 80° C.

Comparative Example 2

A polymer solid electrolyte was prepared in the same manner as in Example 1, except that PEO, which is a polymer that does not have a cross-linkable functional group, was used instead of PVA.

Comparative Example 3

A polymer solid electrolyte was prepared in the same manner as in Comparative Example 1, except that a solution including PVA, which is a polymer having a cross-linkable functional group, and LiTFSI, which is a lithium salt, was applied on SS foil, which is a substrate, and then dried at room temperature (25° C.).

Comparative Example 4

A polymer solid electrolyte was prepared in the same manner as in Example 1, except that a 35% aqueous poly (acrylic acid) (PAA) solution (Mw: 100,000 g/mol) was used instead of PVA.

Comparative Example 5

A polymer solid electrolyte was prepared in the same manner as in Example 1, except that PVA having a weight average molecular weight (Mw) of 50,000 g/mol was used.

Comparative Example 6

A polymer solid electrolyte was prepared in the same manner as in Example 1, except that PVA having a weight average molecular weight (Mw) of 146,000 g/mol was used.

Comparative Example 7

A polymer solid electrolyte was prepared in the same manner as in Example 1, except that "OH" included in the cross-linkable functional group of PVA and "Li" of the lithium salt were set to have a molar ratio ([Li]/[OH]) of 0.5.

Comparative Example 8

A polymer solid electrolyte was prepared in the same manner as in Example 1, except that "OH" included in the cross-linkable functional group of PVA and "Li" of the lithium salt were employed to have a molar ratio ([Li]/[OH]) of 0.52.

Experimental Example 1

In order to measure ionic conductivity of the polymer solid electrolyte in a film form prepared in the Examples and Comparative Examples, the polymer solid electrolyte was punched out in a circular shape with a size of 1.7671 $cm^2$, and the punched polymer solid electrolyte was placed between two sheets of stainless steel (SS) to prepare a coin cell.

Using an electrochemical impedance spectrometer (EIS, VM3, Bio Logic Science Instrument), the resistance was measured under conditions of an amplitude of 10 mV and a scan range of 500 KHz to 20 MHz at 25° C., and then, using Equation 1 below, the ionic conductivity of the polymer solid electrolyte was calculated.

$$\sigma_i = \frac{L}{RA} \quad \text{[Equation 1]}$$

In Equation 1 above, $\sigma_i$ is the ionic conductivity (S/cm) of the polymer solid electrolyte, R is the resistance (Ω) of the polymer solid electrolyte measured by the electrochemical impedance spectrometer, L is the thickness (μm) of the polymer solid electrolyte, and A means an area ($cm^2$) of the polymer solid electrolyte.

The ionic conductivity of the polymer solid electrolyte calculated using Equation 1 above, the possibility of forming a free-standing film, and the results of observing the appearance of the polymer solid electrolyte are shown in Table 2 below. At this time, the possibility of forming the free-standing film (formation: ○, non-formation: X) and the appearance of the polymer solid electrolyte were visually observed.

TABLE 2

| | Ionic conductivity (S/cm) | Formation of free-standing film | Sample condition after freezing/thawing processes | Remarks |
|---|---|---|---|---|
| Example 1 | $1.6 \times 10^{-4}$ | ○ | Free-standing Film | — |
| Example 2 | $1.2 \times 10^{-4}$ | ○ | Free-standing Film | — |
| Example 3 | $1.0 \times 10^{-4}$ | ○ | Free-standing Film | — |
| Example 4 | $4.1 \times 10^{-7}$ | ○ | Free-standing Film | Free-standing film was formed, but ionic conductivity was low and brittleness was observed as well |
| Example 5 | $1.5 \times 10^{-5}$ | ○ | Flexible Film | — |
| Example 6 | $2.5 \times 10^{-5}$ | ○ | Flexible Film | — |
| Comp. Ex. 1 | — | X | Gel | Unable to prepare uniform sample on substrate gel form with high viscosity instead of film form |
| Comp. Ex. 2 | — | X | Liquid | No attempt was made to measure ionic conductivity for liquid sample |
| Comp. Ex. 3 | $4.2 \times 10^{-8}$ | X | Film | Mechanical strength of film was low due to absence of cross-linkage |
| Comp. Ex. 4 | — | X | Liquid | Frozen when freezing, and changed back to initial solution state as it is thawed, no attempt was made to measure ionic conductivity for liquid sample |
| Comp. Ex. 5 | — | X | Liquid | No attempt was made to measure ionic conductivity for liquid sample |
| Comp. Ex. 6 | — | X | Unable to prepare | Unable to prepare solution for forming coating film due to too high molecular weight |
| Comp. Ex. 7 | $1.8 \times 10^{-3}$ | X | Gel | Ionic conductivity was high, but gel form with high viscosity instead of film form |

TABLE 2-continued

| | Ionic conductivity (S/cm) | Formation of free-standing film | Sample condition after freezing/ thawing processes | Remarks |
|---|---|---|---|---|
| Comp. Ex. 8 | $1.9 \times 10^{-3}$ | X | Gel | Ionic conductivity was high, but gel form with high viscosity instead of film form |

As shown in Table 2 above, it was confirmed that, as the polymer having a cross-linkable functional group, a polymer solid electrolyte in a free-standing film form could be prepared by using PVA with a molecular weight in a proper range and a molar ratio ([Li]/[OH]) between the cross-linkable functional group and lithium of the lithium salt, and by applying the freezing and thawing processes (Example 1, Example 2, Example 3, Example 5 and Example 6).

Comparative Example 4 is a case in which PAA was used as the polymer having a cross-linkable functional group, and since it was frozen during the freezing process after forming the coating film and became liquid again during the thawing process, a polymer solid electrolyte in a free-standing film shape was not able to be prepared.

In addition, in Comparative Example 5, PVA was prepared in a liquid phase due to the low molecular weight, and a polymer solid electrolyte in a free-standing film shape was not able to be obtained.

In addition, in Comparative Example 6, PVA had a high molecular weight and a solution for forming the coating film was not able to be obtained, and thus the process for preparing the electrolyte was not able to be performed.

In addition, in Example 4, a film having brittleness (brittle film) was prepared due to a small molar ratio ([Li]/[OH]) between the cross-linkable functional group and lithium, and it was confirmed that the brittle film had significantly low ionic conductivity compared to the free-standing film.

In addition, in Comparative Example 7, a gel with high viscosity was prepared instead of a film due to a large molar ratio ([Li]/[OH]) between the cross-linkable functional group and lithium. The gel had high ionic conductivity, however, it was confirmed that a gel form, instead of a film, is not suitable as a polymer solid electrolyte. The gel form means a solid state having mechanical strength weak enough to be inseparable from the substrate or a liquid state having high viscosity, which is difficult to use as a polymer solid electrolyte.

In addition, in Comparative Example 8, a gel having the molar ratio ([Li]/[OH]) between the cross-linkable functional group and lithium being even higher than Example 1 and having high viscosity was prepared instead of a film. The gel had high ionic conductivity, however, it was confirmed that a gel form, instead of a film, was not suitable as a polymer solid electrolyte.

Comparative Example 1 is an electrolyte prepared using a high-temperature drying process of 80° C., and an electrolyte in a gel form with high viscosity was prepared. A uniform coating film was unable to be formed on the substrate, and when forming the coating film, bubbles, agglomeration, bending and the like occurred.

In Comparative Example 2, an electrolyte was prepared using PEO that does not have a cross-linkable functional group, and was in a liquid state rather than a film form.

In Comparative Example 3, a polymer solid electrolyte was prepared using a room-temperature drying process, and it was seen that, due to the absence of a physical cross-linkage formed by the freezing and thawing processes, the polymer solid electrolyte had low mechanical strength and had low ionic conductivity as well.

FIG. 2 is a graph illustrating a tendency of ionic conductivity of the electrolyte depending on the molar ratio ([Li]/[OH]) between the cross-linkable functional group and the lithium salt.

Referring to FIG. 2, it is seen that ionic conductivity of the polymer solid electrolyte tends to increase as the molar ratio ([Li]/[OH], $n_{Li}/n_{PVA}$) between lithium and the cross-linkable functional group increases in the electrolyte prepared using the freezing and thawing processes. In Comparative Example 3, a polymer solid electrolyte is prepared using a room-temperature drying process, and it can be seen that ionic conductivity is significantly low.

FIG. 3 is a photograph illustrating the electrolyte form depending on the molar ratio ([Li]/[OH]) between the cross-linkable functional group and lithium.

Referring to FIG. 3, it can be seen that Example 4 having a molar ratio ([Li]/[OH]) between the cross-linkable functional group and lithium of 0.1 has a brittle film form, Comparative Example 7 having the molar ratio of 0.5 has a gel form with high viscosity, and Example 1, Example 5 and Example 6 having the molar ratio of exceeding 0.1 and less than 0.5 has a film form, and prepared the polymer solid electrolyte.

Example 7

A polymer solid electrolyte was prepared in the same manner as in Example 1, except that the freezing and thawing processes were performed for 2 cycles.

Example 8

A polymer solid electrolyte was prepared in the same manner as in Example 1, except that the freezing and thawing processes were performed for 3 cycles.

Example 9

A polymer solid electrolyte was prepared in the same manner as in Example 1, except that the freezing and thawing processes were performed for 5 cycles.

Example 10

A polymer solid electrolyte was prepared in the same manner as in Example 1, except that the freezing and thawing processes were performed for 10 cycles.

Comparative Example 9

PVA (Mw: 89,000 g/mol; degree of hydrolysis: >99%) was mixed with water to prepare a 10 wt % aqueous PVA solution, and the solution was applied on SS foil, and then dried at a high temperature (90° C., 3 hours) to prepare a PVA film.

Comparative Example 10

A PVA film was prepared in the same manner as in Comparative Example 9, except that boronic acid was added as a cross-linker.

Experimental Example 2

An experiment was conducted to compare the presence and degree of formation of a cross-linked structure inside the polymer solid electrolyte.

Since only the presence and degree of formation of the cross-linked structure were compared, the PVA film of Comparative Example 9, which did not contain a cross-linked structure, and Comparative Example 10, in which a chemical cross-linked structure was formed by a cross-linker, were used for comparison.

(1) Check the Degree of Swelling

After immersing the sample to be tested in water at room temperature (25° C.) for 12 hours, the degree of swelling of the sample was confirmed, and the degree of swelling was determined according to the following criteria.

<Criteria for Determining the Degree of Swelling>

⊚: Swelled to 80% or more of the total volume.

○: Swelled to 50 or more of the total volume.

Δ: Swelled to 20 or more of the total volume.

X: Swelled to less than 10 of the total volume.

(2) Modulus

Modulus was measured with a universal testing machine (UTM).

TABLE 3

| | Film type | Number of freezing/thawing processes (Cycle) | Modulus (MPa) | Degree of swelling(12 hours@25° C.) | Presence of cross-linked structure |
|---|---|---|---|---|---|
| Example 1 | Polymer solid electrolyte film including PVA | 1 | <0.01 | ○ | Physical cross-linked structure |
| Example 7 | Polymer solid electrolyte film including PVA | 2 | <0.1 | Δ | Physical cross-linked structure |
| Example 8 | Polymer solid electrolyte film including PVA | 3 | <1 | X | Physical cross-linked structure |
| Example 9 | Polymer solid electrolyte film including PVA | 5 | 1 to 5 | X | Physical cross-linked structure |
| Example 10 | Polymer solid electrolyte film including PVA | 10 | 1 to 5 | X | Physical cross-linked structure |
| Comp. Ex. 9 | PVA film | X (High Temp. drying) | 1000 | ⊚ | — |
| Comp. Ex. 10 | Film including PVA and cross-linker | X (high Temp. drying) | 200 to 500 | X | Chemical cross-linked structure |

Referring to Table 3, in Examples 1 and 7 to 10, polymer solid electrolytes prepared by the freezing and thawing processes exhibited modulus above a certain level, and the degree of swelling was reduced as the number of cycles of freezing and thawing increased. Generally, the degree of swelling and mechanical properties of a polymer are greatly affected by the degree of cross-linking. The formation of cross-linking points serves to increase the internal resistance of the polymer chain, thereby causing an increase in resistance to swelling and mechanical strength. In particular, the formation of physical cross-links based on the freezing-thawing processes is affected by the number of repetitions of the freezing-thawing process. From the result that the modulus increases and the degree of swelling decreases as the number of cycles increases, it can be seen that as the number of cycles increases, the cross-linked structure also increases. Although Example 1 showed that the degree of swelling was 50% or more of the total volume, as a result measured after 12 hours at room temperature, it was suitable for the physical properties required of a polymer solid electrolyte for an all-solid-state battery.

It can be seen that the PVA film of Comparative Example 9 swelled to 80% or more of the total volume, and from this, it can be seen that no cross-linked structure is contained inside the polymer.

The PVA film of Comparative Example 10 has a chemical cross-linked structure formed by the addition of boric acid which is a cross-linker, and it was found that it reduces the modulus compared to Comparative Example 9 where no cross-linked structure is formed.

The PVA film of Comparative Example 10 has a reduced modulus compared to Comparative Example 9 because the crystallinity decreases, and the flexibility of the polymer increases as a chemical cross-linked structure is formed.

On the other hand, Examples 1 and 7 to 10 correspond to hydrogel-type PVA films based on a physical cross-linking formed using the freezing and thawing processes, unlike the preparation methods of Comparative Examples 9 and 10. This indicates a tendency for the modulus to increase as the cross-linkage increases. Examples 1 and 7 to 10 illustrated that as the number of cycles of freezing and thawing increased, the cross-linked structure also increased, and thus the modulus also tended to increase. Through the freezing and thawing processes, some of the cross-linkable functional groups contained in PVA form localized crystallites, and the localized crystallites act as a cross-linkable junction point to increase the modulus.

In the above, although the present invention has been described by way of limited embodiments and drawings, the present invention is not limited thereto, and it is apparent that various modifications and variations can be made by those skilled in the art within the equivalent scope of the technical ideas of the present invention and the claims to be described below.

The invention claimed is:

1. A method for preparing a polymer solid electrolyte, comprising:

(1) preparing a solution for forming a polymer solid electrolyte including a polymer solution containing a cross-linkable functional group, and a lithium salt;

(2) unwinding a substrate film using an unwinder and supplying the substrate film to a transfer path;

(3) forming a coating film by applying the solution for forming a polymer solid electrolyte on the substrate film;

(4) freezing the coating film by transferring the coating film-formed substrate film to a freezing section;

(5) preparing a polymer solid electrolyte layer by transferring the frozen coating film-formed substrate film to a thawing section to thaw the frozen coating film; and (6) winding the substrate film including the polymer solid electrolyte layer using a rewinder for recovery.

2. The method according to claim 1, wherein the cross-linkable functional group comprises one or more selected from the group consisting of a hydroxyl group, a carboxyl group, and an amide group.

3. The method according to claim 1, wherein the polymer comprising the cross-linkable functional group has a weight average molecular weight (Mw) of 80,000 g/mol to 130,000 g/mol.

4. The method according to claim 1, wherein the polymer comprising the cross-linkable functional group includes one or more selected from the group consisting of polyvinyl alcohol (PVA), gelatin, methyl cellulose, agar, dextran, poly(vinyl pyrrolidone), poly(ethylene oxide), poly(acrylamide), starch-carboxymethyl cellulose, hyaluronic acid-methyl cellulose, chitosan, poly(N-isopropylacrylamide), and amino-terminated polyethylene glycol (amino-terminated PEG).

5. The method according to claim 1, wherein the lithium salt comprises one or more selected from the group consisting of $LiNO_3$, LiOH, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, and $(FSO_2)_2NLi$.

6. The method according to claim 1, wherein the polymer having a cross-linkable functional group is included in an amount of 5% by weight to 20% by weight, based on the total weight of the polymer solution containing a cross-linkable functional group.

7. The method according to claim 1, wherein a solvent of the polymer solution containing the cross-linkable functional group is water.

8. The method according to claim 1, wherein a molar ratio ([Li]/[G]) of lithium ([Li]) of the lithium salt to the cross-linkable functional group ([G]) of the polymer is exceeding 0.1 and less than 0.5.

9. The method according to claim 1, wherein the freezing is performed at −30° C. to −10° C.

10. The method according to claim 1, wherein the thawing is performed at 15° C. to 35° C.

11. The method according to claim 1, wherein the freezing of (4) and the thawing of (5) produces a polymer solid electrolyte film with a cross-linked structure, and the method further comprises repeating the freezing of (4) and the thawing of (5) on the polymer solid electrolyte film with a cross-linked structure.

12. The method according to claim 1, wherein the polymer solid electrolyte comprises a cross-linked structure; and an amorphous polymer chain containing the cross-linkable functional group, wherein the cross-linked structure comprises (a) a cross-linkage between the cross-linkable functional groups, (b) a cross-linkage between the cross-linkable functional group and a solvent, and (c) a bond between the cross-linkable functional group and the lithium salt, wherein (a) the cross-linkage between the cross-linkable functional groups includes a hydrogen bond;

(b) the cross-linkage between the cross-linkable functional group and a solvent includes a hydrogen bond; and (c) the bond between the cross-linkable functional group and the lithium salt includes a bond by a Lewis acid-base interaction.

13. The method according to claim 12, wherein the solvent comprises water.

14. The method according to claim 12, wherein the cross-linked structure; and the amorphous polymer chain comprising the cross-linkable functional group are formed in (4).

15. The method according to claim 1, further comprising, after (5) and before (6), immersing the polymer solid electrolyte layer in a liquid electrolyte, and then drying the result.

16. The method according to claim 1, wherein the polymer solid electrolyte has ionic conductivity of $10^{-4}$ S/cm or greater.

* * * * *